Patented July 18, 1933

1,918,900

UNITED STATES PATENT OFFICE

JAMES W. DEAN AND JOHN H. DEAN, OF KNOXVILLE, TENNESSEE, ASSIGNORS TO KNOXVILLE FERTILIZER CO., OF KNOXVILLE, TENNESSEE, A CORPORATION OF TENNESSEE

BASIC PHOSPHATIC FERTILIZER AND PROCESS OF MAKING THE SAME

No Drawing.   Application filed June 30, 1932.   Serial No. 620,287.

The present invention relates to an improved form of phosphatic fertilizer and to the process of its manufacture.

The prime object of the invention is to convert ordinary or lumpy acid phosphate (super-phosphate) into a freely drillable and free-running pulverulent fertilizer containing no uncombined acid.

A further object of the invention is to effectively and economically dispose of and remove from a presumably "basic" phosphate fertilizer the therein contained small globular lumps or nodules which, when chemically examined are found to be quite acid on their interior and hence, undesirable when drilled into the ground, as their availability as a plant food is very much diminished and usually not released until they are subjected to extreme weather elements, but at the same time to return the elements making up these globular lumps or nodules in the form of finely divided particles of the same consistency as the major portion of the bulk being processed, to said major portion for mixing therewith, so as to insure that a uniform chemical analysis may be obtained of the finished product in any portion of the mass according to the formula being used.

A further object of the invention is to produce a "basic" phosphatic fertilizer from acid phosphate by admixing the same with dolomite and also in some instances with other fertilizer materials carrying potash or nitrogen, and furthermore, in some mixtures a comparatively small amount of vegetable material, allowing the mixed materials to cure, preparing the mixture for screening, screening out the fine particles which have become chemically fixed during curing, and then reducing the remaining particles of said mixture to a state of fineness sufficient to permit the uncombined acids contained therein to chemically combine and become fixed with the carbonates of the original mixture when finally returned to and mixed therewith to form the completed product, and thus producing a uniform homogeneous mass which is free-running and drillable, containing no uncombined acid, and of such consistency as to permit of accurate chemical analysis in any portion of its entire mass.

Other objects will appear from the further description and claims herein.

The present invention may briefly be described as consisting of chemically fixing the uncombined acids, both phosphoric acid and sulphuric acid, as contained in acid phosphate (super-phosphate) by means of a basic material incapable of causing reversion of the available phosphate, under such conditions that the mass thus produced will not "set up" or harden, but will remain freely running, of homogeneous consistency, and subject to uniform chemical analysis in any position of the mass. This is accomplished by taking ordinary acid phosphate, such as that commonly produced by treating phosphate rock with sulphuric acid, and mixing the same with ground dolomite or limestone, and treating and processing the mixture as hereinafter described.

A better understanding of the present invention will be derived from a brief discussion of the prior art and the difficulties encountered therein which lead to the development of the present process.

The so-called acid phosphate, also termed "super-phosphate", as made and used in the fertilizer art, is produced by mixing natural phosphate rock, suitably comminuted, with sulphuric acid. The usual formula employed in this art comprises the use of from 52 to 55% of the ground phosphate rock in admixture with from 45 to 48% of ordinary chamber sulphuric acid which tests at approximately 50° Beaumé. The mixing of the sulphuric acid and the phosphate rock is usually accomplished mechanically, being carried out in dens. The resulting product, after being allowed to remain undisturbed for a brief time is then usually removed from the dens and placed in a pile where it is allowed to remain for a period of from a few days to a few months, the purpose being to permit the reaction to proceed as far as possible, whereby the sulphuric acid will gradually be consumed with the concomitant formation of phosphates which are available for plant use when applied to the soil. In producing the commercial types of fertilizer mixtures, it is usual to place the various materials desired to be admixed into the "boot" of a suitable bagging machine, wherein the mixing is allowed to take place as an incident to the passing of the material through the machine.

The usual and predominant method as described herein of manufacturing acid phosphate consists of a wet mix which produces a product that contains free phosphoric acid, free sulphuric acid and excessive moisture. For this reason, the final product produced from this wet mix is very gummy, and the nature of the particles is to cling and adhere, and when handled, these particles adhere to one another and form small balls or nodules which become increasingly harder the more they are handled and the more they are mechanically impacted when passing through the conveying and filling machinery.

Ordinarily the acid phosphate, or superphosphate as thus made is mixed with inert fillers to reduce its content of available phosphoric acid to a predetermined amount, this filler consisting ordinarily of some neutral material, such for instance as plain silica or sand. Acid phosphate, moreover, makes up the larger part of the ordinary fertilizer mixtures and whether used in such mixtures or by itself carries these heretofore mentioned balls or nodules of undesirable size which cannot in the prevailing practice be reduced by grinding, because of the peculiar gumminess of the material, the ultimate result being that such a product could not be either ground to a more desirable condition or screened so as to give full effectiveness in practical farm use.

The objections to the product produced by the prevalent method as above described are as follows:—

*First.*—The acid phosphate as produced contains a perceptible amount of unstable and uncombined phosphoric acid and sulphuric acid and also an excessive amount of water moisture. The unstable and uncombined phosphoric acid when placed in the soil and subjected to the alloys of iron and aluminum combines with these elements and becomes unavailable for plant use. Sulphuric acid is a poison and a recognized enemy to soils and crops.

*Second.*—The unstable and uncombined phosphoric acid, sulphuric acid, and moisture causes the acid phosphate to be gummy, clinging and adhesive, and because of this the nature of the mixture when handled is to form as a part of the final product small balls, clods or nodules.

It was to these two problems that the present inventor's endeavors and investigations were directed, and with an ultimate view to producing a uniform homogeneous phosphatic fertilizer with no chemically uncombined phosphoric acid, no free sulphuric acid, and a low moisture content, and furthermore, one uniformly subdivided into small particle units which would be subject to even distribution in the soil, available for plant use, and of uniform reliable chemical analysis.

It has been long recognized by the best authorities that carbonates of lime and magnesium combined with phosphoric acid in the proper relation improve the value of the phosphoric acid as a plant food. It has also been known that a chemical combination of these carbonates with sulphuric acid neutralizes the injurious quality. With this knowledge and hope of achieving the improved product desired, the present inventors started a series of experiments dealing mainly with the mixing with acid phosphate, ground dolomite or ground limestone. They finally centered their experiments upon ground dolomite for the reason that dolomite carried about 38% of magnesia (MgO) and the process produced a perceptible amount of available magnesia phosphate which is recognized as a valuable plant food. When acid phosphate and dolomite were mixed in a relation of about two parts of acid phosphate to one part of dolomite and allowed to remain in the pile until full chemical action had taken place, it was thought that all the uncombined phosphoric acid and uncombined sulphuric acid would be chemically combined with the carbonates of lime and magnesium. It was found, however, that the fertilizer clods or nodules contained in the acid phosphate had not been reduced. In fact, each process of handling seemed to increase their number, and these clods or nodules represented a large percentage of the bulk of the mixture. Chemical analysis showed that the interior of these clods or nodules had not at all been affected chemically by the dolomite, and that they were still acid. The dolomite had chemically combined with the phosphoric acid and sulphuric acid on the exterior of these clods or nodules and formed a protecting crust around the same. This rendered the clods or nodules resistant to pressure and practically impervious to moisture. In this connection, it may be stated after investigation that at least one-third of the bulk of the fertilizer mixture resisted the moisture and elements throughout the entire growing season and only became available subsequently by reason of the action of extreme weather elements, and furthermore, it was found that these clods or nodules after being in the soil under a growing crop for a full growing season were intact and chemical analysis showed them to contain free acid.

This was a difficulty not foreseen and a problem that was necessary to solve in order to produce a homogeneous phosphatic fertilizer free of uncombined phosphoric acid and uncombined sulphuric acid and of low moisture content. The efforts of the present inventors culminated in the present invention, wherein they found that by reducing this material, including the clods or nodules, to a finely divided product, that the carbonates came in contact with all of the phosphoric acid and sulphuric acid, thereby producing a homogeneous "basic" product (all uncombined acids chemically fixed with carbonates) of low moisture content, capable of free drilling and even distribution in the soil and of uniform chemical analysis.

Furthermore, it was found that by the expedient of adding from 20 to 40 lbs. per ton of finely divided organic vegetable matter, such as ground tobacco stems, peanut hull dust, cotton-seed meal and castor-bean pomace, to the other ingredients above specified, guaranteed that the small particles of "basic" phosphate would remain indefinitely in a separated relation and state of fineness to which they had been ground, assuring a free-running drillable product.

In carrying out the present process, the following steps are employed:—The crude acid phosphate, preferably such as has been taken from a pile about six weeks old or older, is mixed with the required amount of dolomite, preferably in the proportion of one part of dolomite to two parts of the phosphate, and preferably with the vegetable material mentioned. No attempt is made at this stage to grind the material but merely to admix the same as thoroughly as possible, following which admixture the material is again placed back in the pile and allowed to remain for upward of six weeks. After this period, the material is broken up to some extent and screened to permit only the fine particles (those which form a part of the final product and contain no uncombined acid) to pass through the screens, and the lumpy portion is then put through a suitable mill, such as a hammer mill, or any other device capable of converting the same to a state of fineness to pass through the screens and permit the uncombined acids contained therein to chemically combine and become fixed with the carbonates of the original mixture when finally mixed therewith to form the completed product, so that the combined product will be free running, and when used in a drill will not arch therein but will feed uniformly through the outlet thereof. An important part of the process is the use of a sieve or screen with elongated openings, or slots, so as to produce a flakey final product which, by the presence of flakes therein, lends itself more readily to operations in a drill such as used for placing fertilizer in the soil.

The further advantage in the present product lies in the fact that a part of the magnesia itself is found to be present therein in combination with phosphoric acid and in a form available as a plant food, for it has been demonstrated that it performs such function. It is believed that the magnesia, when present in the form of a phosphate, aids the nitrogen in the soil or fertilizer in helping the plant to develop a greater leaf and blade growth, while at the same time conserving the potash supply of the soil.

The present process makes it possible to produce a homogeneous "basic" phosphatic fertilizer, namely a material in which the particles have been reduced until they are all subjected to the same chemical exposure guaranteeing a homogeneous material of a high uniformity in both a mechanical and chemical composition—subject to even distribution in the soil and all ingredients readily available as soon as they get into the soil, so that the small feeding rootlets of the young plants may avail themselves of said ingredients and grow to more rapid and uniform maturity.

It is preferable, in the process, to use a dolomite containing about 38% of magnesia (MgO) and 50% of lime (CaO). The dolomite not only serves the purpose of rendering the phosphate "basic" but furnishes also a valuable plant food, namely magnesia. It is true, however, that limestone could be substituted for dolomite and by the use of this process produce a "basic" phosphatic fertilizer.

A careful study of the prior art makes it clearly evident that no fertilizer having the characteristics claimed herein, nor a process of producing said fertilizer, has thus far been disclosed.

In order to realize the importance of the present invention, and to fully appreciate the reason for producing a uniform homogeneous finely comminuted product, it is desired to call attention to the following facts: All States have laws governing the sale of fertilizer and to define the elements that are legally recognized as fertilizer materials. These recognized elements are required to be printed on the package which contains the fertilizer as well as the percentage of each element therein contained. The elements that are recognized as plant foods by all of the States are phosphoric acid, nitrogen, and potash. Phosphoric acid is the most common of all the elements used, and in fact constitutes the base of practically all fertilizer formulas. Aside from acid phosphate, there are what is known as potash mixtures, consisting of phosphoric acid and potash. Further than this, there is a fertilizer consisting of phosphate, potash and nitrogen mixed, usually termed a complete fertilizer. Potash mixtures and complete fertilizers constitute a large bulk of the fertilizer output in the United States.

It has been shown herein that acid phosphate in its present form as commonly manufactured, is composed of various sized particles which bring about inherent difficulties which the present invention is desired to correct. Furthermore, potash is usually of a crystal nature, and in fact most of it is formed of crystals averaging about the size of a half grain of wheat. Nitrogen has various sources such, for instance, as cyanamid which is a pulverized dust, and nitrate of soda which is in the form of crystals of various sizes. Tankage, cotton-seed meal, and other organic sources are all highly fibrous and of light weight.

It will therefore be seen that the nature of these fertilizer materials constituting the recognized plant foods are of different weights, consistency and size, and due to this fact it is impractical and impossible by any method that is now being employed to make a uniform product in chemical analysis or mechanical fineness. While it might be true that each recognized plant food material runs uniform as to gravity, consistency and chemical analysis, all of these materials are of different gravity and consistency as to size of particles, one from the other, and even though initially mixed to a uniform condition, the several materials, due to their difference in gravity and consistency, will separate in the handling of the mixture either in bulk or in the package, resulting in various analysis in different parts of the bulk or package.

However, by the present process, applicant reduces all of these fertilizer materials to a homogeneous mass of uniform consistency and to a state of fineness sufficient to permit all uncombined acids therein contained to chemically combine and become fixed, thereby permitting accurate analysis to be had throughout the entire mass of the final product and in accordance with the formula used.

What it is desired to protect by Letters Patent is the following:—

1. The process of producing a basic phosphatic fertilizer which comprises the steps of admixing acid phosphate with carbonates and other fertilizer materials, allowing the resulting mixture to age for a desired period, screening off the particles of said mixture which have become chemically fixed during aging, comminuting the remaining particles of said mixture to a state of fineness sufficient to permit the free acids contained therein to chemically combine and become fixed with the carbonates of the original mixture when finally mixed therewith to form the completed product.

2. The process of producing a basic phosphatic fertilizer which comprises the steps of admixing acid phosphate with dolomite and certain other well known fertilizer materials, allowing the resulting mixture to age for a desired period, breaking up the material of said mixture and preparing the same for screening, screening off the particles which have become chemically fixed during aging, and finally grinding the remaining particles of said mixture to a state of fineness to permit the uncombined acids contained therein to chemically combine and become fixed with the carbonates of the original mixture when finally mixed therewith to form the completed product.

3. The process of producing a basic phosphatic fertilizer which comprises the steps of admixing acid phosphate with carbonates and other fertilizer materials according to a predetermined formula, piling the mixture, allowing the resulting mixture to age for a desired period in the pile, and mechanically treating the entire bulk of said mixture in a continuous process to reduce all of the materials to a uniform chemically homogeneous mass and to a state of fineness sufficient to permit all uncombined acids therein contained to chemically combine and become fixed, whereby the resulting final product is reduced to such consistency as to permit of accurate and uniform chemical analysis throughout its entire mass according to the formula used.

4. The process of producing a basic phosphatic fertilizer which comprises the steps of admixing acid phosphate with carbonates and a small amount of vegetable material, thoroughly mixing the already enumerated ingredients to form a homogeneous mass, aging said mass, and mechanically treating the entire mass in a continuous process to reduce all of the materials to a uniform consistency and to a state of fineness sufficient to permit all uncombined acids contained therein to chemically combine and become fixed, whereby the resulting product will remain indefinitely in a free running and drillable condition and subject to accurate chemical analysis throughout its entire mass.

5. The process of producing a basic phosphatic fertilizer which comprises the steps of admixing acid phosphate with dolomite and a small amount of vegetable material, thoroughly mixing the already enumerated ingredients to form a homogeneous mass, aging said mass, and mechanically treating the entire mass in a continuous process to reduce all of the materials to a uniform consistency and to a state of fineness sufficient to permit all uncombined acids contained therein to chemically combine and become fixed, whereby the resulting product will remain indefinitely in a free running and drillable condition and subject to accurate chemical analysis through its entire mass.

6. A homogeneous free-running finely divided fertilizer comprising a mixture of two parts by weight of acid phosphate, one part by weight of dolomite, and from 15 to 40 lbs. per ton of the aforesaid mixture of comminuted vegetable material.

7. A homogeneous free-running finely divided fertilizer comprising two parts by weight of acid phosphate, one part by weight of dolomite, and from 15 to 40 lbs. per ton of the aforesaid mixture of comminuted vegetable material of the group consisting of tobacco stem dust, peanut hull meal, cottonseed meal, and castor bean pomace.

8. The process of producing a fertilizer which comprises the steps of admixing acid phosphate with dolomite and a small amount of vegetable material, allowing the resulting mixture to age for a period of upward of five weeks, and thereupon comminuting the resulting material to a state of fineness sufficient to produce a free-running product.

9. The process of producing a basic phosphatic fertilizer which comprises mixing substantially two parts of acid phosphate with one part of dolomite and from 15 to 40 lbs. of ground vegetable material, thoroughly mixing the already enumerated ingredients to form a homogeneous mass, aging said mass, and finally grinding the same to a state sufficient to produce a free-running drillable product.

10. The process of producing a basic phosphatic fertilizer which comprises the steps of admixing acid phosphate with dolomite, allowing the resulting mixture to age for a desired period, screening off the particles of said mixture which have become chemically fixed during aging, comminuting the remaining particles of said mixture to a state of fineness sufficient to permit the free acids contained therein to chemically combine and become fixed with the carbonates of lime and magnesia in the dolomite of the original mixture when finally mixed therewith to form the completed product.

11. The process of producing a basic phosphatic fertilizer which comprises the steps of admixing acid phosphate with other fertilizer materials including carbonates, aging the mixture in bulk, removing the chemically combined portion of the mixture, and finally reducing the uncombined portion to a state of fineness permitting chemical combination of free acids and carbonates and mixing the latter portion with the first portion to produce a fertilizer in which uniform analyses may be obtained through the mass.

12. The process of producing a basic phosphatic fertilizer which comprises the steps of mixing some material which contains carbonates such as ground limestone, or ground dolomite, with superphosphate and other fertilizer materials and placing the admixture in a pile, allowing the resulting mixture to age for a desired period, and finally re-processing the resultant mixture in such a way as to reduce all particles to a state of fineness and in such physical relation as to permit any uncombined acids contained therein to chemically combine and become fixed with the carbonates of said mixture.

13. The process of producing a basic phosphatic fertilizer which comprises the steps of admixing acid phosphate with other fertilizer materials including carbonates, allowing the resulting mixture to age for a desired period, screening off the particles of said mixture which have become chemically fixed during aging, comminuting the remaining uncombined particles of said mixture to a state of fineness sufficient to permit the free acids contained therein to chemically combine and become fixed with the carbonates therein, then mixing with the original mixture to form the completed product having a chemical analysis uniform throughout the mass.

14. A fertilizer comprising a mixture of acid phosphate and other fertilizer materials including carbonates, said mixture being aged and thereafter reduced to a fine state of subdivision, whereby a permanent homogeneous free drilling product such that chemical analysis will be substantially uniform throughout the mass is produced.

15. A fertilizer comprising a mixture of acid phosphate and other fertilizer materials including dolomite, said mixture being aged and thereafter reduced to a fine state of subdivision, whereby a permanent homogeneous free drilling product such that chemical analysis will be uniform throughout the mass is produced.

16. A fertilizer comprising a mixture of acid phosphate and other fertilizer materials including carbonates, said mixture being aged and thereafter reduced to a state of subdivision capable of passing through a sixteen mesh screen, whereby a permanent homogeneous free drilling product wherein the chemical analysis will be uniform throughout the mass is produced.

JAMES W. DEAN.
JOHN H. DEAN.